United States Patent [19]
Langseth et al.

[11] 4,287,598
[45] Sep. 1, 1981

[54] COOPERATING ARRANGEMENT FOR DIVERSITY STATIONS

[75] Inventors: Rollin E. Langseth, Colts Neck; Yu S. Yeh, Freehold Township, Monmouth County, both of N.J.

[73] Assignee: Bell Telephone Laboratories, Incorporated, Murray Hill, N.J.

[21] Appl. No.: 104,190

[22] Filed: Dec. 17, 1979

[51] Int. Cl.³ .............................................. H04B 7/02
[52] U.S. Cl. ........................................ 455/52; 455/8; 455/10; 455/12
[58] Field of Search .................... 455/8, 10, 12, 15, 52; 340/147 SC

[56] References Cited

U.S. PATENT DOCUMENTS

| | | | |
|---|---|---|---|
| 3,693,088 | 9/1972 | Rustako et al. | 455/52 |
| 3,829,777 | 8/1974 | Muratani et al. | 455/8 |
| 3,831,093 | 8/1974 | Walker | 455/135 |
| 3,896,382 | 7/1975 | Magenheim | 455/12 |
| 4,052,670 | 10/1977 | Watanabe et al. | 455/52 |
| 4,099,121 | 7/1978 | Fang | 455/12 |
| 4,218,654 | 8/1980 | Ogawa et al. | 455/12 |

OTHER PUBLICATIONS

"The Future of Commercial Satellite Telecommunications"-W. White et al., Datamation-Jul. 1978, pp. 94-102.
"Space Diversity System for TDMA Satellite Links'-'-J. H. Deal, IEEE 4th International Conf. on Digital Satellite Communications, Record, Montreal, Canada, Oct. 23-25, 1978, pp. 319-326.
"Technical Aspects in the Future Development of Satellite Comm. Syst. with Particular Reference to Use of Freqs.", Above 10 GHz-F. Carassa-Conf. Record of 26th Conv. of Nuclear Electronics and Aerospace, Rome, Italy-Mar. 9-18, 1979, pp. 22-42.

*Primary Examiner*—Marc E. Bookbinder
*Attorney, Agent, or Firm*—Erwin W. Pfeifle

[57] ABSTRACT

The present invention relates to a cooperating arrangement for a pair of space diversity stations (30 and 40) interconnected by a communication link (20) wherein each station normally communicates independently with a remote point (12) of the system while handling traffic related to a separate service region (32 and 42) or separate portion of an overall service region. At the occurrence of a fade condition at one of the two stations, the fading station alerts the other station of the pair of such condition, and both stations are enabled to cause the normal two-way communications between the faded station and the distant point to be routed over the communication link for two-way transmission between the non-faded station of the pair and the distant point along with the normal associated two-way transmissions between the non-faded station and the distant point.

8 Claims, 9 Drawing Figures

COOPERATING ARRANGEMENT FOR DIVERSITY STATIONS

TECHNICAL FIELD

The present invention relates to a cooperating arrangement for diversity stations and, more particularly, to a cooperating arrangement wherein distant diversity stations independently communicate with a remote region or repeater and serve separate portions of a service region or separate service regions using a separate distribution network under non-fade conditions at both stations, and when one diversity station experiences a fade condition in communications with the remote region or repeater, the faded diversity station communicates with that remote region or repeater via the other diversity station not experiencing a fade condition using a communication link between diversity stations during the interval of fade.

BACKGROUND ART

The current trend in communication satellites appears to be increasingly toward the use of the 12/14 GHz and higher frequency bands and the use of digital modulation formats with Time Division Multiple Access (TDMA) techniques. The former provides freedom from existing 4/6 GHz terrestrial interference and also provides higher antenna gain and narrower beams for a given size aperture, while digital transmission in conjunction with TDMA provides for more efficient utilization of the available satellite system resources.

A major drawback associated with 12/14 GHz and higher frequency systems is the signal attenuation associated with rainfall. In general, attenuation at these higher frequencies is an increasing function of rain rate, with the result that techniques must be employed to prevent excessive outage in areas where rain fades can occur.

Techniques which have been used to provide appropriate rain margin include (1) transmitting a burst several times, (2) increasing the radiated power of the satellite and earth stations, (3) improving the noise figure of the receivers, (4) installing larger ground station antennas, and (5) providing site diversity. In a typical site diversity arrangement, a main station serving a designated service area normally handles all communications with a satellite and is connected by a land communication link to a diversity station perhaps 10 or more kilometers away which is beyond the extent of a normal rain area. When the main station experiences a rain fade, a control circuit causes all communication with the satellite to be routed via the communication link and the diversity station. In this regard see, for example, U.S. Pats. No. 3,829,777 issued to T. Muratani et al on Aug. 13, 1974; U.S. Pat. No. 3,896,382 issued to B. Magenheim on July 22, 1975; U.S. Pat. No. 4,052,670 issued to T. Watanabe et al on Oct. 4, 1977; and U.S. Pat. No. 4,099,121 issued to K. J. F. Fang on July 4, 1978.

The use of diversity stations significantly increases the amount of equipment required and requires high-capacity links between the two diversity stations. The problem remaining in the prior art is to provide a diversity arrangement wherein the extra equipment required is significantly reduced.

SUMMARY OF THE INVENTION

The foregoing problem has been solved in accordance with the present invention which relates to a cooperating arrangement for diversity stations and, more particularly, to a cooperating arrangement wherein diversity stations independently communicate with a remote region or repeater and serve a separate portion of a service region or separate service regions using a separate distribution network under non-fade conditions at both stations and when one diversity station experiences a fade condition in communications with the remote region or repeater, the faded diversity station communicates with that remote region or repeater via the other diversity station not experiencing a fade condition using a land communication link during the interval of fade.

Other aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

The present invention is described hereinafter primarily in relation to a satellite communication system since a main anticipated use would be in such system. However, it will be understood that such description is exemplary only and is for purposes of exposition and not for purposes of limitation. It will be readily appreciated that the inventive concept described could be applied wherever space diversity stations are used.

Figure 1:
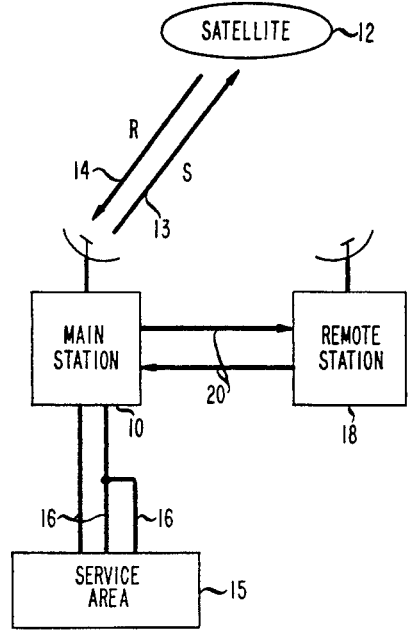
FIGS. 1 and 2 illustrate a typical prior art diversity station arrangement under a non-fade and fade condition, respectively, occurring at a main station.
Figure 2:
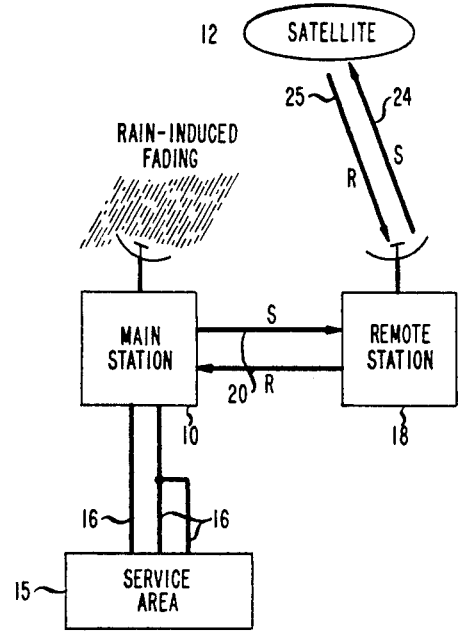

FIGS. 1 and 2 illustrate a conventional prior art diversity earth station arrangement for use in a satellite communication system and how such arrangement communicates with a satellite under a non-fade and a fade condition, respectively, occurring at the main station. More particularly, as shown in FIG. 1, a main station 10 having a traffic capacity C, when not experiencing a fade condition, normally communicates with a satellite 12 via up-link beam 13 and down-link beam 14 while handling all traffic to and from a service area 15 using a distribution network 16. A remote diversity earth station 18 is coupled to main station 10 via a high capacity two-way land communication link 20 and is idle.

During a fade condition at main station 10 caused by, for example, rain shower 22 of FIG. 2, traffic between main station 10 and satellite 12 is indirectly transmitted via the high capacity land communication link 20, remote diversity earth station 18 and up-link beam 24 and down-link beam 25 while main station 10 handles all traffic to and from service area 15 via distribution network 16. It is to be understood that all control for transmissions and distribution is handled by main station 10, and that remote station 18 is generally a slave station located at a distance from main station 10 to generally ensure that both stations 10 and 18 do not concurrently experience a rain fade condition. The use of a remote diversity station 18 ensures continued transmissions between station 10 and satellite 12 but increases costs by the requirement of a high capacity link 20 of a capacity C and a second earth station site and antenna. Since the remote diversity station 18 provides redundant protection, redundant equipment at main station 10 need not be provided unless so desired and, therefore, the overall amount of RF electronics is essentially unchanged over a single station arrangement by the use of the space diversity arrangement.

Figure 3:
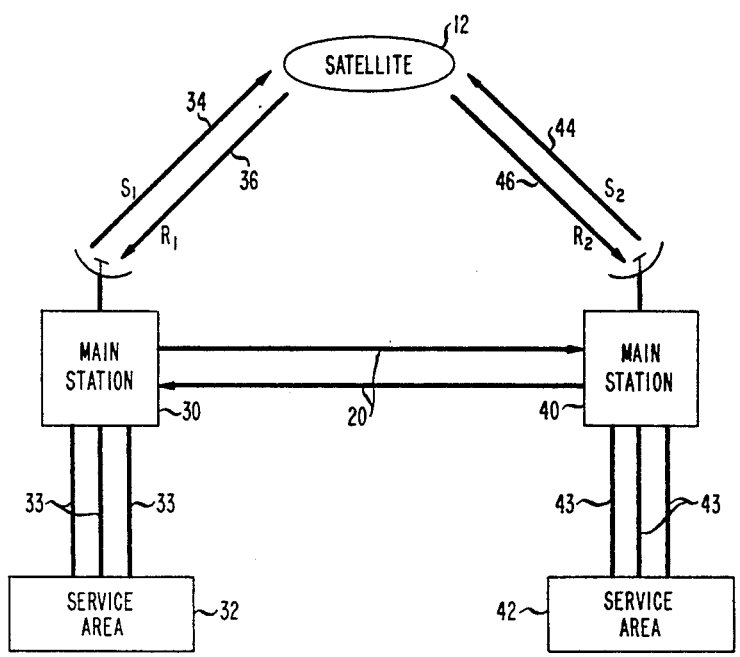
FIG. 3 illustrates a cooperating diversity station arrangement and the operation thereof under a non-fade condition at both stations in accordance with the present invention.

In accordance with the present invention, and as shown in FIG. 3, the concept of a slave remote station as shown in FIGS. 1 and 2 is discarded and a remote diversity station is treated as an equal. In FIG. 3, a first main station 30 handles all traffic to and from a service area 32 via a distribution network 33 and communicates with satellite 12 via up-link beam 34 and down-link beam 36. Concurrent therewith, a second main station 40 is handling all traffic to and from a separate service area 42 via a distribution network 43 and communicates with satellite 12 via up-link beam 44 and down-link beam 46. Main stations 30 and 40 are located at a distance from one another to generally ensure that both stations do not concurrently experience a rain fade condition. Main stations 30 and 40 are interconnected by a land communication link 20 which is only used during a fade condition at one of the stations as will be described hereinafter.

During normal operation, stations 30 and 40 access the satellite 12 in the usual, well known, Time Division Multiple Access (TDMA) mode as shown in FIG. 3 and each is a main station which carries the total traffic from its associated service area 32 and 42, respectively. It is to be understood that service areas 32 and 42 can comprise totally separate service areas or separate portions of an overall service area as, for example, service area 15 of FIGS. 1 and 2.

Figure 4:
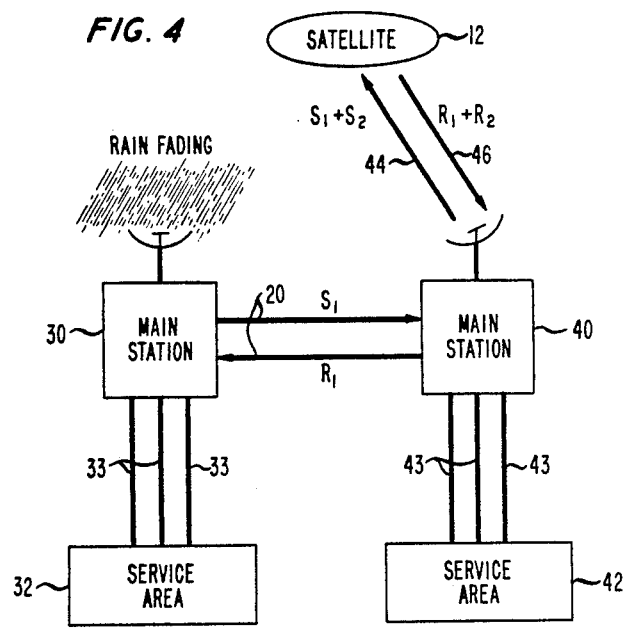
FIGS. 4 and 5 illustrate the functioning of the diversity station arrangement of FIG. 3 under conditions where a fade is experienced by a first and a second diversity main station, respectively.

As shown in FIG. 4, during a rain fade condition at main station 30, main station 40 takes over transmissions between the satellite 12 and both stations 30 and 40. More particularly, station 40 receives from station 30 the messages $S_1$ from station 30 destined for satellite 12 via communication link 20, and transmits messages $S_1$ along with its own messages $S_2$ in the proper TDMA time slots to satellite 12 via up-link beam 44. Station 40 also receives from satellite 12 in down-link beam 46 the messages $R_1$ destined for station 30 and messages $R_2$ destined for station 40, retains messages $R_2$ for distribution to its associated service area 42 via distribution network 43 and transmits the messages $R_1$ via communication link 20 to station 30 for distribution by that station to its associated service area 32 via its distribution network 33.

Figure 5:
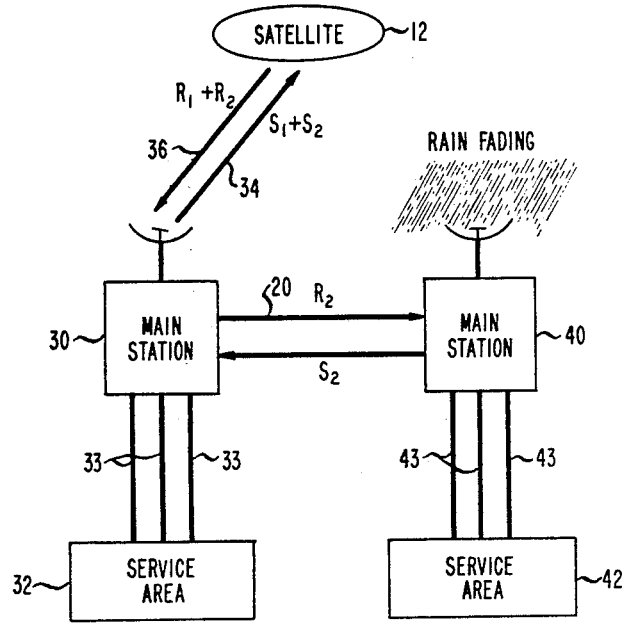

Similarly, as shown in FIG. 5, during a rain fade condition at main station 40, station 30 takes over transmission between the satellite 12 and both stations 30 and 40. More particularly, station 30 receives the messages $S_2$ from station 40 destined for satellite 12 via communication link 20 and transmits messages $S_2$ along with its own messages $S_1$ in the proper TDMA time slots to satellite 12 via up-link beam 34. Station 30 also receives from satellite 12 in down-link beam 36 the messages $R_2$ destined for station 40 and the messages $R_1$ destined for station 30, retains messages $R_1$ for distribution to its associated service area 32 via distribution network 33 and transmits the messages $R_2$ via communication link 20 to station 40 for distribution by that station to its associated service area 42 via its distribution network 43.

From the foregoing discussion it can be seen that the capacity of the communication link 20 of FIGS. 4 and 5 is less than the total traffic carried by the two stations 30 and 40 and the link capacity need only match the traffic normally carried by the larger of the two stations. With the present arrangement a cost of a second earth station site and antenna together with that of a possibly-reduced capacity link 20 between stations would still be required. However, the second main station 40 is now carrying its share of the burden of serving subscribers in that it is carrying revenue-generating traffic most of the time instead of standing idle as in the arrangements of FIGS. 1 and 2.

There may be situations in which the penalty of the cost of a second earth station site can be greatly reduced as, for example, in urban areas where two or more toll stations already exist or are planned. Where two existing stations exist at a great distance from one another as, for example, 160 kilometers, the cost of the land communication link may exceed the cost of a conventional diversity station. Under such condition either a conventional diversity station 18 must be provided or a convenient point of traffic concentration within the 16–24 kilometer range of the originally planned earth station, e.g., station 30, must be found at which to construct a cooperating main station, e.g., station 40 in accordance with the present invention.

In accordance with the present invention, earth stations are essentially paired for purposes of overcoming fade conditions caused by precipitation. It is clear that each station needs some additional hardware to enable it to take on an additional load approximately equal to its normal load when its mate station is experiencing a fade condition. As indicated hereinbefore, no additional RF equipment is required if the stations are operating in the TDMA mode since messages are transmitted in the same frequency band in an interleaved format as is well-known in the art.

It is clearly desirable that the switchover to the cooperating mode during a fade be made as transparent as possible to the end users of the satellite system, at least insofar as data transmision is concerned. Because of differential delays between the two mate stations and the satellite, it is not possible, in general, to effect a synchronous takeover, unless appropriate buffers are used. Prior to discussing such buffering requirements, it is deemed helpful to discuss the necessary buffer requirements at any earth station to participate in an "ordinary" TDMA operation, i.e., without diversity considerations although the need for compression and expansion buffers is well known. It will be assumed that all of the station's traffic has been sorted by destination, so that the following discussion pertains to all traffic destined for a particular one of the several other stations with which the subject station is communicating.

For purposes of discussion, it will be assumed that each earth station is assigned capacity in units of a basic burst length. For example, each burst may consist of 800-bits of information plus TDMA overhead bits, such that transmission of one such burst in each 250 μsec subframe corresponds to a capacity of 100, 32 kb/s voice circuits.

Figure 6:
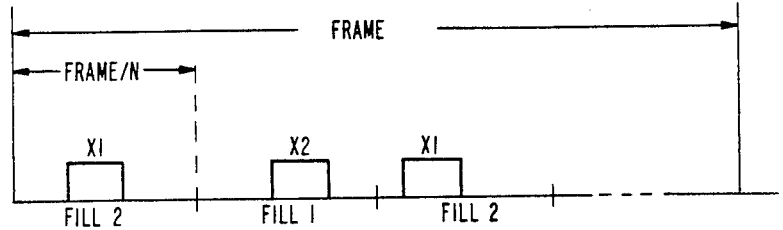
FIG. 6 illustrates a typical TDMA frame interval where N bursts from an earth station are approximately uniformly spaced within the frame to only require two buffers at the earth station.

In general, the number of buffers required to transmit N bursts per frame period depends on how the bursts are distributed throughout the frame. For example, FIG. 6 illustrates a case where the bursts associated with a main station and destined for transmission via satellite 12 to other main stations in the system occur at approximately uniform spacings within a frame period. If it is assumed that a station transmits N bursts per frame and it takes 1/Nth of a frame to fill a burst buffer from the composite continuous bit stream from all terrestrial sources terminating on the earth station via its associated distribution network and which are destined for a particular other station, then if there is only one TDMA burst transmission schedule per interval of length 1/Nth of a frame period it is clear that only two high-speed burst buffers are necessary,. As shown in FIG. 6, while the stored information is being transmitted out of buffer No. 1, indicated by the symbol X1, a second buffer is being filled with information, indicated by the phrase FILL 2. In the next 1/Nth frame interval this information stored in buffer No. 2 is transmitted, as indicated by the symbol X2, while new information is being stored in buffer No. 1, as indicated by the phrase FILL 2, and this procedure continues in a similar manner.

Figure 7:
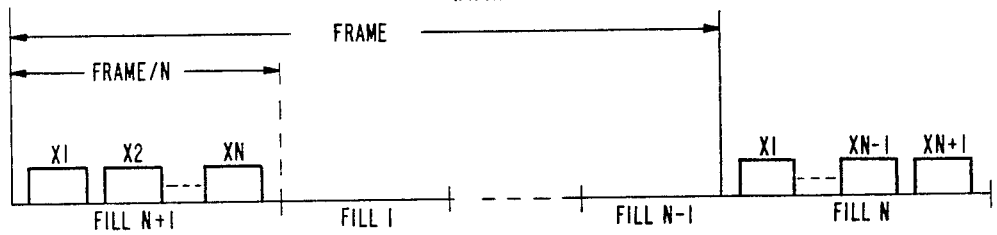
FIG. 7 illustrates a typical TDMA frame interval wherein N bursts from an earth station are transmitted sequentially during a 1/N interval of the frame to require N+1 buffers at the earth station.

If, on the other hand, because of various TDMA burst assignments throughout the satellite system, a given earth station must transmit all of its bursts within one interval of length 1/N of a frame period as shown in FIG. 7, then N+1 burst buffers would be required and transmissions and the filling of each buffer would occur as indicated in FIG. 7. More particularly, a separate burst buffer would be filled with new information during each 1/N frame period and at the indicated 1/N frame period for transmission, the information in the full burst buffers would be sequentially transmitted while the remaining empty burst buffer is filled with new information.

Thus, the additional amount of buffering required at a given earth station to enable it to provide the diversity takeover function depends on where the additional bursts have to be placed within its transmission frame. It can be said only that the number of additional buffers for reception from, or transmission to, a particular station is between two and N+1. Since TDMA assignments at earth stations 30 and 40 can change from time to time to accommodate varying traffic patterns, it would generally be required that an additional N+1 number of buffers be supplied at each diversity cooperating station 30 and 40 to enable the diversity takeover function of any single-destination traffic pattern from the station.

In performing the diversity takeover, it may be desirable to provide a "hitless" switchover, that is, to switch over in such a fashion that no information is lost. For voice circuits, this is not necessary, in that a lost frame of information would cause only a 37 click" to be heard by the users. Data customers, on the other hand, would lose data and would have to retransmit one or more blocks. Again, this may not be a serious problem, since switchover would be relatively infrequent, and requires only that the data customer be using some form of error detection which is used almost universally nowadays, e.g., parity checks plus repeated transmission in case of error. Nevertheless, by appropriate buffer design, it is possible to eliminate even these occasional dropouts, as will now be discussed.

For purposes of discussion, the two propagation delays from station 30 and 40 to the satellite 12 will be designated by $\tau_{p1}$ and $\tau_{p2}$, respectively, and the terrestrial interconnection link 20 delay between stations 30 and 40 will be denoted by $\tau_t$. By simple geometrical considerations, it is always true that $\tau_{p1} < \tau_{p2} + \tau_t$ and $\tau_{p2} < \tau_{p1} + \tau_t$; this is a consequence of the so-called triangle inequality which states that the length of any side of a triangle is no longer than the sum of the length of the other two sides.

Figure 8:
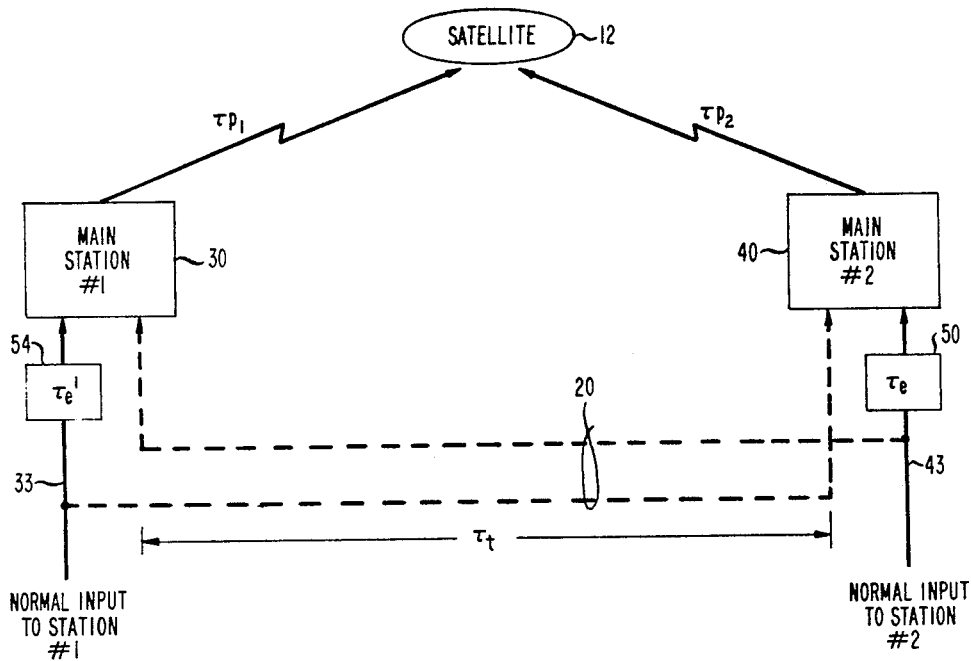
FIG. 8 illustrates buffering arrangement to permit transmit delay compensation for hitless switching between cooperating diversity stations in accordance with the present invention.

As shown in FIG. 8, both stations 30 and 40 normally have some delay buffering prior to their transmission equipment. Station 30 requires a delay $\tau'_e = \tau_{p2} + \tau_t - \tau_{p1}$ as supplied by delay buffer 54, so that in both normal and faded modes of system operation its transmit information experiences a total delay $\tau'_e + \tau_{p1} = \tau_t = \tau_{p2}$. Likewise, station 40 requires a delay of $\tau_e = \tau_{p1} - \tau_{p2} + \tau_t$ as provided by delay buffer 50 so that its transmit information always experiences a delay $\tau_e + \tau_{p2} = \tau_{p1} + \tau_t$. It is, of course, to be understood that delay buffers 50 and 52 in FIG. 8 are located at the appropriate one or both of associated stations 30 and 40 and are merely shown remote from each station in the Figures for illustrative purposes only.

The additional delay, $\tau_e$ or $\tau_{e'}$, shown in FIG. 8 is composed of two parts; terrestrial delay plus differential satellite path delay between the two stations. Knowledge of the latter is contained in the relative offsets of the station's respective transmit times from the synchronization frame markers received from the satellite at, for example, the beginning of a frame period. Such information can be shared among the stations via the signaling channels existing between all stations and a master station of the system as is well known in the art. It should be noted that differential delays change at about 1 percent of the rate of the absolute delays which themselves change no faster than a few nsec per sec. Terrestrial delay, on the order of 50 μsec for a 16 kilometer diversity spacing, can probably be measured once and for all upon initial installation and, if necessary, occasional soundings of the terrestrial facility can be utilized to update its delay estimate.

For a further understanding, by way of example, a diversity separation of about 16 kilometers is such that the terrestrial delay is around 50 μsec or slightly longer. At this separation, it turns out that the magnitude of the differential satellite delay can also approach 50 μsec. Hence, the maximum delay needed in an arrangement like that shown in FIG. 8 is around 100 μsec. Considering further a moderately large earth station with 60 Mb/s of information for transmission to some destination, then a delay of 100 μsec corresponds to a buffer requirement of 6000-bits. In order to transmit 60 Mb/s in a burst mode, it would require, for burst buffering, at least two 800-bit buffers, or 1600-bits as per the discussion hereinbefore and there might be required as many as $$N + 1 = \frac{60 \text{ Mb/s} \times 250 \text{ }\mu\text{sec/frame}}{800 \text{ bits/burst}} + 1 = 20 \text{ burst buffers.}$$

or 16,000 bits. Thus, to provide the 6000 bits of buffering needed to synchronize the diversity station does not place a severe penalty on buffering requirements.

Whether the diversity takeover is performed with or without loss of information, the takeover bursts must be properly positioned within the TDMA frame so as to arrive at the satellite at the same time as they had been arriving from the fading station. This requires that each station in a diversity pair be aware of the current TDMA slot assignments of its mate, which can be accomplished via the signaling channels to the master station of the system.

Figure 9:
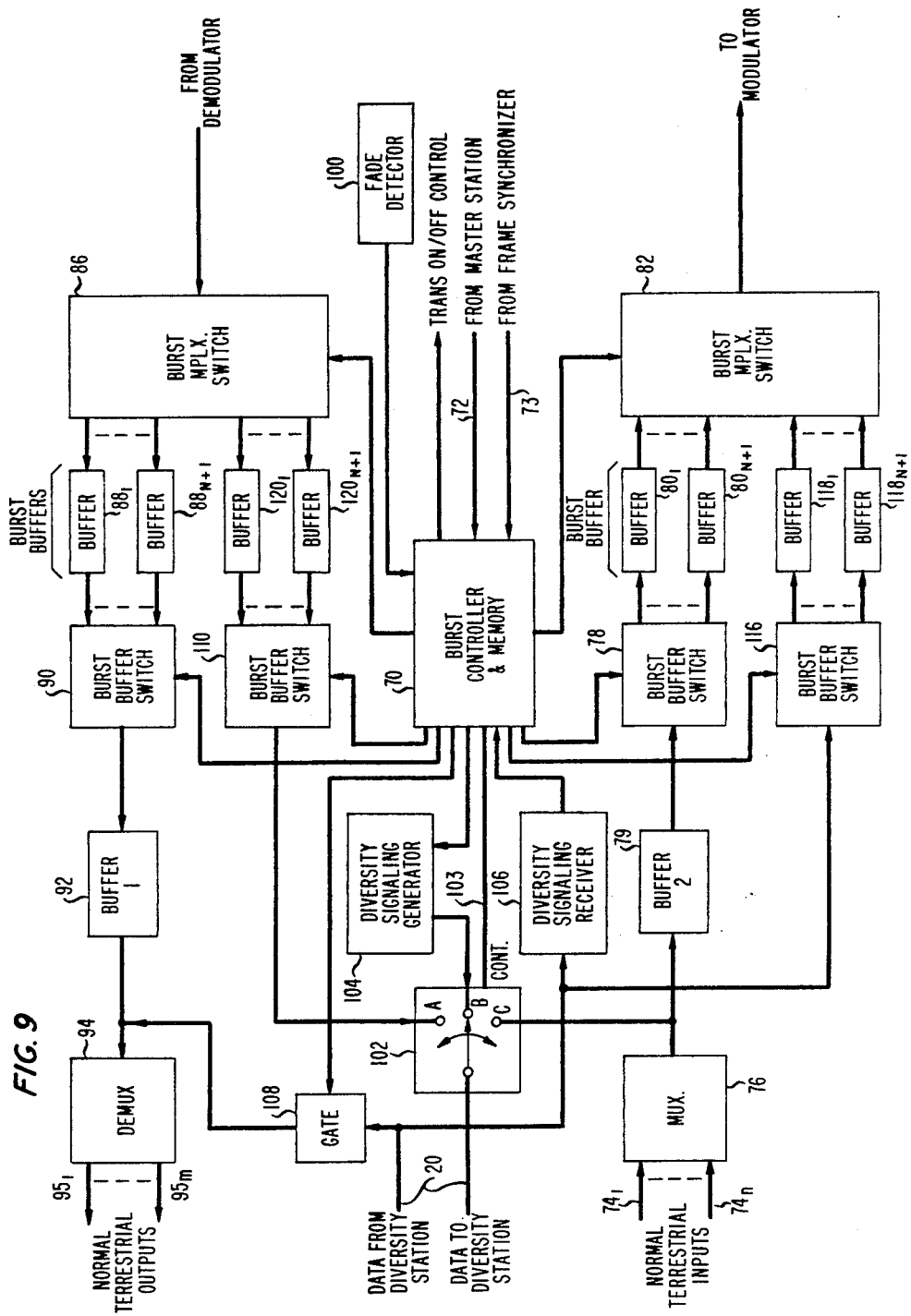
FIG. 9 illustrates a block diagram of a typical cooperating diversity station arrangement in accordance with the present invention.

FIG. 9 shows a typical block diagram of a cooperating diversity main station 30 or 40 in accordance with the present invention. As is well known in the art, for the proper TDMA mode of operation, each station must be apprised of the time slot periods within each frame interval assigned to that station, and in accordance with the present invention also the other cooperating diversity station's assigned time slot periods, for the transmission and reception of information via satellite 12. In FIG. 9, such information would be stored in the memory section of a burst controller and memory 70, which assigned time slot information can be periodically updated by a ground or satellite link 72 with the master ground station of the system. Each ground station additionally must be synchronized using any suitable technique well known in the art to ensure proper transmission and reception of the time slot bursts within each frame interval. For such purpose a frame synchronizer (not shown) provides controller 70 with such synchronization information on a continuing basis over lead 73.

For a typical non-fade condition at both cooperating main stations 30 and 40 as shown in FIG. 3, each station would operate in the following manner. Normal digital terrestrial inputs on leads $74_1$–$74_n$ would be multiplexed on a time-division basis in multiplexer 76. The digital bit stream from multiplexer 76 would be transmitted to a burst buffer switch 78 via a buffer 79, buffer 79 being representative of buffers 50 or 54 of FIG. 8 for providing a proper delay. Burst buffer switch 78, under the direction of burst controller 70 sequentially fills a plurality of two or more burst buffers $80_1$–$80_{N+1}$ which are then transmitted by a burst multiplex switch 82, under the direction of burst controller 70 in the manner described hereinbefore in the discussion of FIGS. 6 and 7, to a modulator for up-converting to the proper frequency band for transmission to satellite 12.

Transmissions from the satellite are received and down-converted in a demodulator (not shown) and distributed by a burst multiplex switching means 86 into the proper two or more burst buffers $88_1$–$88_{N+1}$ under the control of burst controller 70. Burst buffers 88 are sequentially emptied out by a burst buffer switch 90 under the control of burst controller 70 and transmitted via a buffer 92 to a demultiplexer 94 where the digital bit stream is distributed to the normal terrestrial outputs $95_1$–$95_n$. Buffer 92 is representative of buffers 50 or 54 in FIG. 8.

When a fade condition is detected by a fade detector 100 at one of the cooperating diversity stations as, for example, main station 30 as shown in FIG. 3, detector 100 notifies burst controller 70 of such condition. Burst controller 70 in turn generates a control signal over lead 103 to a 3-position switching means 102 to cause the switching means to connect the output of a diversity signaling generator 104 to the communication link 20 and to cooperating diversity station 40. Burst controller 70 then causes generator 104 to transmit a unique takeover coded signal over communication link 20 to cooperating station 40 to indicate to that station to begin its take-over procedure as shown in FIG. 3. This unique take-over signal is detected by a diversity signaling receiver 106 at station 40 and as an option the burst controller 70 at station 40 can cause its signaling generator 104 to return a uniquely coded confirmation signal back to station 30 over link 20.

Upon receipt of the optional confirmation signal, the burst controller 70 at station 30 would cause switching means 102 to interconnect multiplexer 76, coupled to terminal C of switching means 102, and communication link 20 so that the multiplexed terrestrial inputs to station 30 would be sent to station 40 via link 20 as indicated by the designation $S_1$ in FIG. 3. Concurrent therewith, burst controller 70 at station 30 would also activate a gate 108 to permit the returning transmissions from the satellite via station 40 and communication link 20, indicated as $R_1$ in FIG. 3, to be directed to demultiplexer 94 at station 30 for distribution to the associated terrestrial outputs.

At station 40, upon receipt of the take-over signal from station 30 and the optional return of a confirmation signal as discussed hereinabove, burst controller 70 at station 40 causes its switching means 102 to interconnect a burst buffer switch 110, connected to terminal A of switching means 102, and communication link 20. Station 40, in operation, receives the $S_1$ signals from faded station 30 over communication link 20 and since gate 108 at station 40 has not been activated, the $S_1$ signals are transmitted to buffer switch 116 which under the direction of burst controller 70, sequentially loads two or more burst buffers $118_1$–$118_{N+1}$ in the manner shown in FIG. 7. During each frame period burst controller 70 causes the $S_1$ signals stored in burst buffers $118_1$–$118_{N+1}$ and the $S_2$ signals associated with the terrestrial inputs of station 40 and stored in buffers $80_1$–$80_{N+1}$ to be transmitted in the assigned time slots for both stations 30 and 40 via burst multiplex switch 82.

The $R_1$ and $R_2$ signals in FIG. 3 returning from satellite 12 are received by station 40 in the appropriate time slot bursts of the frame period, and burst controller 70 causes burst multiplex switch 86 to (a) sequentially store the $R_1$ signals, for station 30, in two or more burst buffers $120_1$–$120_{N+1}$ and (b) sequentially store the $R_2$ signals for station 40 in the two or more burst buffers $88_1$–$88_{N+1}$. Burst controller 70 also causes (a) the burst buffer switch 90 to read out the information stored in burst buffers $88_1$–$88_{N+1}$ and transmit such information via buffer 92 and the demultiplexer 94 to the appropriate terrestrial outputs serviced by station 40 and (b) the burst buffer switch 110 to read out the information stored in burst buffers $120_1$–$120_{N+1}$ and transmit such information via switch 102, communication link 20 and gate 108 at station 30 to the demultiplexer 94 at station 30 for distribution to the appropriate terrestrial outputs at station 30.

At the conclusion of the fade condition at station 30, burst controller 70 at station 30 would activate switch 102 to permit diversity signaling generator 104 to transmit a uniquely coded return-to-normal signal, which would be detected by the diversity signaling receiver 106 at station 40 and both stations would return switches 102, gate 108, etc. to the normal operating condition as shown in FIG. 3 and described hereinbefore.

It is to be understood that the above-described embodiments are simply illustrative of the principles of the invention. Various other modifications and changes may be made by those skilled in the art which will embody the principles of the invention and fall within the spirit and scope thereof. For example, transmissions between each of the cooperating diversity stations 30 and 40 and the satellite 12 could be accomplished using TDMA bursts in the same frequency spectrum as outlined hereinbefore or by signals in different frequency bands.

We claim:

1. A space diversity arrangement comprising:
a first transmitting and receiving cooperating diversity station (30) capable of both handling traffic associated with a first service region (32) via an associated distribution network (33) and providing two-way radio communication with a distant point (12) characterized in that
the arrangement further comprises:
a second transmitting and receiving cooperating diversity station (40) capable of both handling traffic associated with a second service region (42) via an associated distribution network (43) and providing two-way radio communication with the distant point (12);
a communication link (20) interconnecting the first and second stations;
fade detecting means (100) disposed at each of the first and second stations capable of detecting a fade condition occurring in transmissions between each of the first and second stations and the distant point for generating a control signal representative of such occurring fade condition; and
diversity switching means (70, 102, 104, 106, 108, 110, 116, $118_1$-$118_{N+1}$ and $120_1$-$120_{N+1}$) disposed at each of the first and second stations responsive to said control signal from the associated fade detecting means for causing the station detecting a fade condition to communicate with the distant point via the communication link and the station not detecting a fade condition, with the station not experiencing a fade condition thus providing two-way communication with the distant point for both the first and second station for as long as the fade condition exists while the first and second stations will handle the traffic associated with the first and second service region, respectively.

2. A space diversity arrangement in accordance with claim 1 characterized in that
the diversity switching means comprises:
means (104, 106) at each of the first and second stations capable of generating a take-over signal to the other station via the communication link in response to a detected fade condition and detecting such take-over signal when received on the communication link from a fading station.

3. A space diversity arrangement in accordance with claim 2 characterized in that
the diversity switching means further comprises:
means (102, 108) at each of the first and second stations capable of, in response to a detected fade condition at one of the stations, switching the two-way signal transmissions normally sent between the fading station and the distant point over the communication link to the non-faded station for two-way transmission between the non-faded station and the distant point along with the normal two-way transmissions between the non-faded stations and the distant point.

4. A space diversity arrangement in accordance with claim 2 or 3 characterized in that
the diversity switching means further comprises:
first buffering means (78, $80_1$-$80_{N+1}$, 116, $118_1$-$118_{N+1}$) at each of the first and second stations capable of both receiving and appropriately storing the normal signals from the associated service region for transmission to the distant point and, in response to a received take-over signal from the fading cooperating diversity station, receiving from the communication link from the fading station and appropriately storing the signals normally transmitted by the fading station to the distant point;
second buffering means (86, $88_1$-$88_{N+1}$, $120_1$-$120_{N+1}$) at each of the first and second stations capable of both receiving and appropriately storing the normal signals from the distant point destined for the associated service region and also in response to a received take-over signal from the fading cooperating diversity station, receiving and appropriately storing the signals from the distant point normally transmitted to the fading cooperating diversity station; and
transmitting means (70, 82, 90, 110) coupled to the first and second buffering means capable of transmitting the signals stored in the first buffering means to the distant point and for transmitting the signals stored in the second buffering means destined for the associated service region and the fading cooperating diversity station to appropriate outputs of the service region and the communication link, respectively.

5. A transmitting and receiving cooperating diversity station (30 or 40) for use in a space diversity arrangement wherein a pair of such stations are spaced-apart and interconnected by a communication link (20) and wherein each station is capable of providing two-way communication with a distant point (12), the station comprising:
fade detecting means (100) capable of detecting a fade condition occurring in transmissions between the station and the distant point and for generating a control signal representative of such fade condition characterized in that
the station further comprises:
means ($74_1$-$74_n$, 76, 94, $95_1$-$95_n$) capable of handling two-way traffic with an associated service region (32 or 42) via an associated distribution network (33 or 43); and
diversity switching means (70, 102, 104, 105, 108, 110, 116, $118_1$-$118_{N+1}$, $120_1$-$120_{N+1}$) capable of (a) being responsive to control signals from the fade detecting means for generating a take-over control signal which is applied to an input to the communication link for transmission to the other station of the pair of spaced-apart interconnected stations and for switching normal two-way communications with the distant point directly to the input to the communication link to permit such two-way communications to be transmitted via the communication link and the other station of the pair of spaced-apart interconnected stations to the distant point, and (b) being responsive to a take-over control signal received from the other station of the pair of spaced-apart interconnected stations at an output from the communication link for providing the capability of two-way communications between the transmitting and receiving cooperating diversity station and the distant point for both normal two-way communications associated with the related service region and two-way communications received on the communication link that would normally be sent by the other station of the pair of spaced-apart interconnected stations to the distant point.

6. A transmitting and receiving cooperating diversity station in accordance with claim 5 characterized in that the diversity switching means comprises:

first buffering means (78, $80_1$–$80_{n+1}$, 116, $118_1$–$118_{N+1}$) capable of both receiving and appropriately storing the normal signals from the service region handling means for transmission to the distant point and, in response to a received take-over control signal from the other station of the pair of spaced-apart interconnected stations on the communication link, receiving from the communication link and appropriately storing signals normally transmitted by said other station of the pair of spaced-apart interconnected stations to the distant point;

second buffering means (86, $88_1$–$88_{N+1}$, $120_1$–$120_{N+1}$) capable of both receiving and appropriately storing the normal signals from the distant point destined for the associated service region and, in response to a take-over control signal received from the other station of the pair of spaced-apart interconnected stations on the communication link, receiving and appropriately storing the signals from the distant point normally transmitted directly to the other station connected to the communication link; and transmitting means (70, 82, 90, 110) coupled to the first and second buffering means capable of transmitting the signals stored in the first buffering means to the distant point at the appropriate time and for transmitting the signals stored in the second buffering means and destined for the associated service region and the other station of the pair of spaced-apart interconnected stations to the service region handling means and the communication link, respectively.

7. A method of providing a space diversity arrangement wherein a pair of space diversity stations (30 and 40) are interconnected by a communication link (20) and each station is capable of providing two-way radio communication with a distant point (12) of the system characterized in that the method comprises the steps of:

(a) during a non-fade condition at each of the two space diversity stations, causing each of the stations to handle the traffic of a separate service region (32 or 42) via an associated distribution network (33 or 43) and for directly transmitting and receiving two-way communications with the distant point that are related to the associated service region; and during a fade condition occurring at one of the two space diversity stations;

(b) detecting the occurrence of a fade condition at any one of the two stations;

(c) in response to step (b), transmitting a take-over control signal over the communication link from the fading station to the non-faded station of the pair of stations;

(d) enabling the fading station in response to step (b) for rerouting the normal direct two-way communications between the fading station and the distant point via the communication link to the non-faded station of the pair of stations while handling all the traffic of the associated service region; and (e) concurrent with step (d) and in response to step (c), enabling the non-faded station of the pair for providing direct two-way communication between the non-faded station and the distant point for both signals to the service region associated with the non-faded station and signals associated with the faded station transmitted on the communication link.

8. A method of providing a space diversity arrangement in accordance with claim 7 characterized in that in performing step (e), providing concurrent steps of:

(f) receiving and appropriately storing both the normal signals from the service region associated with the non-faded stations and the signals received on the communication link from the faded station;

(g) receiving and appropriately storing the signals from the distant point destined for both the service region associated with the non-faded station and the communication link for transmission to the faded station; and (h) transmitting the signals stored in step (f) at the appropriate time and frequency band to the distant point and the signals stored in step (g) to the proper destinations of the associated service region and communication link.

* * * * *